United States Patent [19]

Schlachet

[11] 4,299,601

[45] Nov. 10, 1981

[54] APPARATUS FOR FILTERING, WASHING AND COOLING GASES

[75] Inventor: Hugo Schlachet, Cleveland Heights, Ohio

[73] Assignee: Bessam Manufacturing, Inc., Cleveland, Ohio

[21] Appl. No.: 187,599

[22] Filed: Sep. 15, 1980

[51] Int. Cl.³ ............................................. B01D 47/06
[52] U.S. Cl. ........................................ 55/230; 261/92; 239/220; 239/221
[58] Field of Search ......................... 55/230, 247, 259; 62/279, 280; 239/219–221; 261/92

[56] References Cited

U.S. PATENT DOCUMENTS

| 694,106 | 2/1902 | Metcalf et al. | 239/220 |
|---|---|---|---|
| 1,189,457 | 7/1916 | Levy et al. | 134/89 |
| 1,462,363 | 7/1923 | Christensen | 261/92 |
| 1,480,775 | 1/1924 | Marien | 55/230 |
| 1,503,755 | 8/1924 | Harrison | 261/92 |
| 1,803,792 | 5/1931 | Christensen | 261/92 |
| 2,258,357 | 10/1941 | Goodman et al. | 261/92 |
| 2,339,982 | 1/1944 | Dalton | 55/230 |
| 2,428,842 | 10/1947 | Feinberg | 261/36 |
| 2,904,972 | 9/1959 | Smilack | 62/280 |
| 3,719,353 | 3/1973 | Cherne et al. | 261/92 |
| 3,728,083 | 4/1973 | Greenburg et al. | 261/92 |
| 3,744,774 | 7/1973 | Huisman et al. | 261/92 |
| 3,798,881 | 3/1974 | Schwartz et al. | 55/230 |
| 3,948,627 | 4/1976 | Schwarz et al. | 55/230 |

FOREIGN PATENT DOCUMENTS

| 690860 | 7/1964 | Canada | 261/92 |
|---|---|---|---|
| 801172 | 9/1958 | United Kingdom | 55/230 |

Primary Examiner—David L. Lacey
Attorney, Agent, or Firm—Millard and Cox

[57] ABSTRACT

An apparatus for filtering, washing and cooling gases, wherein gas is forced through a foraminous wall extending across a chamber and water is sprayed across the chamber on the upstream side of the wall to filter, wash and cool the gas, employs as the water sprayer a rotating disc bearing projections which scoop up relatively large amounts of liquid and cast it against an atomizing member. The impact of the liquid on the atomizing member breaks the liquid into small droplets and produces a uniform spray.

3 Claims, 3 Drawing Figures

APPARATUS FOR FILTERING, WASHING AND COOLING GASES

FIELD OF THE INVENTION

This invention relates to an apparatus for filtering, washing and cooling gases incorporating a liquid-spraying apparatus.

BACKGROUND OF THE INVENTION

One known form of apparatus for filtering, washing and cooling gases comprises an inlet duct for conducting such gas to a chamber, an outlet duct for conducting gas away from this chamber, a foraminous wall extending across the chamber and through which gas passes on its way from the inlet duct to the outlet duct, means for forcing gas through the foraminous wall and a liquid sprayer for spraying a curtain of water across the chamber between the inlet duct and the wall. Various liquid sprayers may be used to produce a spray or mist of liquid droplets in such apparatus. Typically, in such liquid sprayers a rotor having the form of a cylinder or disc dips just below the surface of a bath of liquid in a container. The rotor revolves at high speed so that it picks up liquid during its passage therethrough and then flings the liquid tangentially away from the rotor. In designing such sprayers, it is desirable that the rotor be made to lift as much liquid as possible from the bath of liquid into which it dips, but it is also necessary to ensure that the spray or mist of droplets which is flung from the rotor is as uniform as possible, both as regards the sizes of the droplets therein and their dispersion within the curtain of spray formed by the rotor.

Three types of rotor are known in the art, namely smooth cylinders, smooth discs, and toothed discs, that is to say discs bearing projections extending out of the plane of the discs. Smooth cylinders are bulky and so heavy that they are difficult to balance on a shaft revolving at high speed. In addition, since the water or other liquid being sprayed only adheres to the surface of the cylinder by surface tension, the quantity of water sprayed by a smooth cylinder is small relative to the large power needed to rotate a heavy cylinder at high speed. Smooth discs are lighter and easier to balance than smooth cylinders but spray only a small amount of water so that a very large number of discs may be necessary where large quantities of water have to be sprayed. Toothed discs spray far more water than smooth discs because the projections act as scoops lifting water out of the bath. Unfortunately, the spray produced by known apparatus using toothed discs lacks uniformity, both as regards to the sizes of individual droplets within the spray and the angular dispersion of the spray.

SUMMARY OF THE INVENTION

The invention provides an apparatus for filtering, washing and cooling gases of the aforementioned known type in which the liquid sprayer comprises a toothed disc and in which the spray produced by the sprayer is uniform.

This invention overcomes the problems of non-uniform spraying by toothed discs by providing an atomizing member fixed so as not to rotate with the disc, this atomizing member is located substantially radially of the disc and through the plane thereof, the atomizing member being disposed adjacent that portion of the edge of the disc which travels upwardly during operation. The atomizing member is preferably disposed below the axis of the disc and mounted upon a mounting member having a mounting surface facing the periphery of the disc and having the form of part of a cylinder coaxial with the disc. To control the dispersion of the spray produced by the disc there may be provided on the mounting member a shield member having an edge spaced from but substantially parallel to the plane of the disc, this edge of the shield member lying adjacent the upwardly-traveling portion of the disc.

DETAILED DESCRIPTION OF THE DRAWINGS

Figure 1:
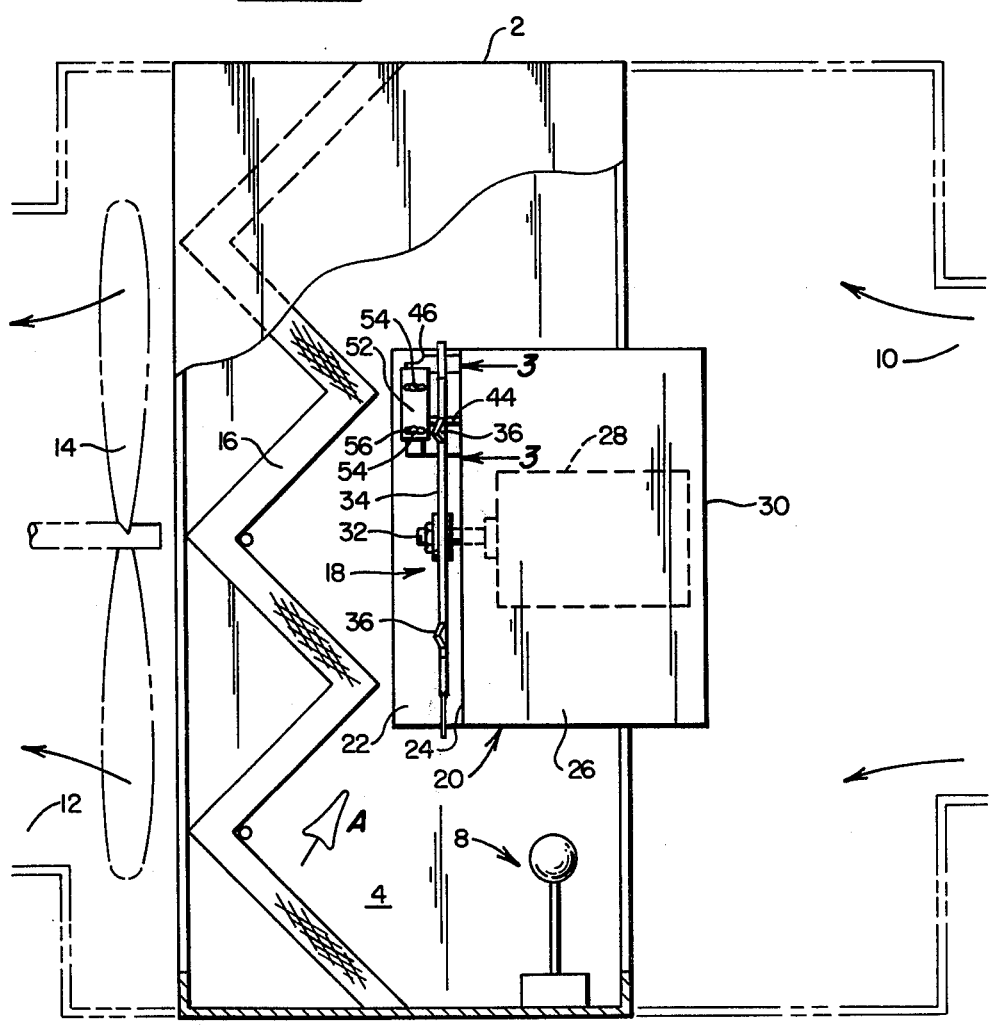
FIG. 1 is a plan view of an apparatus for filtering, washing and cooling gases incorporating a liquid spraying apparatus according to this invention.
Figure 2:
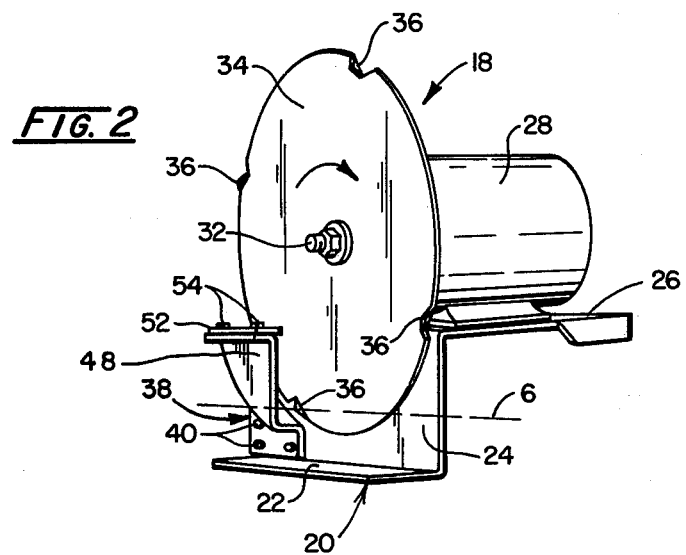
FIG. 2 is a perspective view of the liquid spraying apparatus only, looking in the direction of arrow A in FIG. 1 but with the protective cover removed.
Figure 3:
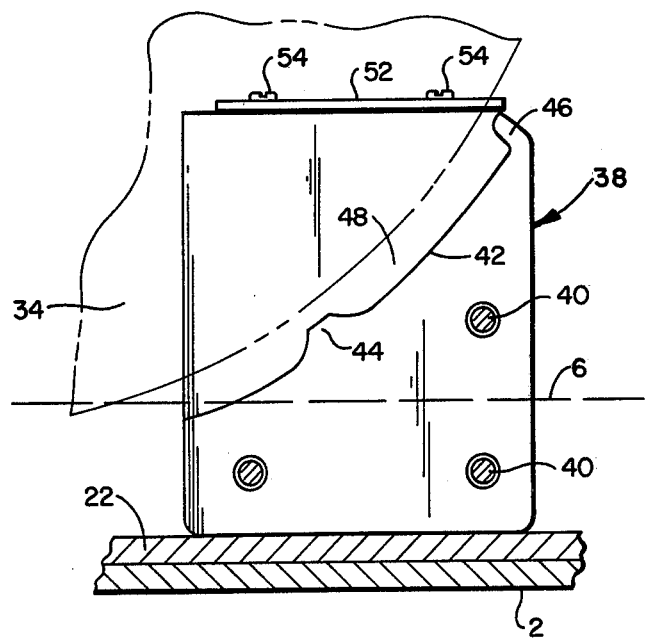
FIG. 3 is an enlarged section along the line 3—3 in FIG. 1.

The apparatus for filtering, washing and cooling gases shown in FIGS. 1-3 comprises a cuboidal container or housing 2, the upper face of which is broken away in FIG. 1 in order to show details of the various components therein. The housing 2 defines a chamber 4 which is filled with water to a level indicated by the broken line 6 in FIGS. 2 and 3, the level of this water being kept constant by a conventional constant lever device generally designated 8 in FIG. 1. The chamber 4 is provided with an inlet duct 10 and an outlet duct 12 within which is accommodated a fan 14 which is rotated by an electric motor (not shown) to cause air to be drawn in through the inlet duct 10, through the chamber 4 and out through the outlet duct 12, as shown by the unlettered arrows in FIG. 1.

A foraminous wall 16 extends completely across the chamber 4, dividing the chamber into two halves. As shown in FIG. 1, the foraminous wall 16 is sawtoothed in horizontal cross-section. The wall 16 serves to prevent the entrainment of large droplets of water in the stream of gas passing through the chamber, to prevent any large bodies from being retained in the gas and to assist in providing humidity in the gas leaving the chamber 4. The foraminous wall may be of any conventional shape, thickness or composition.

Mounted within the chamber 4 on the inlet side of the foraminous wall 16 is a liquid spraying apparatus generally designated 18 and best seen in FIG. 2. The liquid spraying apparatus comprises a base plate 20 having a first horizontal section 22 which is bolted to the bottom of the housing 2, a vertical section 24 and a second horizontal section 26 which extends parallel to the base of the housing 2 above the water level 6. An electric motor 28 provided with a protective cover 30 (see FIG. 1) is mounted upon the second horizontal section 26 and rotates a horizontal shaft 32 in one direction (clockwise as seen in FIG. 2). Mounted upon the shaft 32 and rotating therewith is a disc 34, which is disposed in a vertical plane and has the lowest portion of its periphery dipping into the water in the housing 2. Four projections 36 are symmetrically disposed around the periphery of the disc 34. The projections 36 are formed by cutting slots inwardly from the periphery of the disc 34 and then bending a portion of the disc adjacent the slot until it extends normally to the plane of the disc.

A mounting member 38 is secured to the vertical portion 24 of the base plate 20 by three bolts 40 so that it is disposed adjacent the portion of the edge of the disc which travels upwardly as the disc 34 rotates with the shaft 32. The mounting member 38 has a mounting surface 42 (best seen in FIG. 3) which faces the periphery of the disc and has the form of part of the surface of a cylinder having the same axis as the disc 34 and the shaft 32. Upper and lower atomizing members 44 and 46 are provided on the surface 42 and extend towards the periphery of the disc 34 substantially radially thereof and through the plane of the disc 34. Both the atomizing members 44 and 46 are disposed below the axis of the disc 34 and it will be seen from FIG. 3 that the upper atomizing member 46 extends closer to the axis of the disc 34 than does the lower atomizing member 44. It has been found that to ensure optimum spraying of water by the disc 34, the plane including the axis of the disc 34 and the upper atomizing member 46 should be at about 45° to the vertical plane through the axis of the disc. In the particular embodiment shown in FIG. 3, the atomizing members 44 and 46 are in fact formed integrally with the mounting member 38 as a single casting. However, if desired the atomizing members may be formed separately from the mounting member and secured thereto by screws, bolts of other conventional fixing devices.

An upper section 48 of the mounting member 38 extends upwardly beyond the surface 42 parallel to the plane of the disc 34 and bears at its upper edge a flange 30 which extends horizontally away from the disc 34. A rectangular shield member 52 is mounted upon the flange by two bolts 54 which pass through elongate slots 56 (FIG. 1) in the shield member 52. As best seen in FIG. 3, the shield member 52 lies adjacent the upwardly-traveling portion of the disc and adjacent the upper atomizing member 46. The edge of the shield member 52 closest to the disc 34 is spaced from but parallel to the plane of the disc 34; the elongate slots 56 enable this spacing to be adjusted in order to control the extent to which spray produced by the disc 34 can travel axially of the disc 34 and the shaft 32. The shield member 52, which is disposed adjacent the face of the disc 34 closer to the foraminous wall 16, serves to minimize the number of large water droplets which are thrown by the disc 34 in the direction of the wall 16.

In operation, the electric motor 28 turns the shaft 32 and the disc 34 at high speed, typically of the order of 1750 rpm. As the projections 36 on the disc 34 pass rapidly through the water in the housing 2, they scoop up water and cast it against the atomizing members 44 and 46 at high speed. The impact of the water upon the atomizing members 44 and 46 is sufficient to atomize the water into small droplets which form a dense and relatively uniform curtain of spray extending across the chamber 4 in the plane of the disc 34. The rotating disc 34 pumps or draws the atomized droplets through the cavity between its periphery and surface 42 to fling it in a fan shaped pattern perpendicular to the direction of flow of the gas passing through chamber 4. The axial extent of this curtain along the common axis of the shaft 32 and the disc 34 is controlled by the spacing of the shield member 52 from the face of the disc 34 and by the spacing of the disc 34 from the vertical section 24 of the base plate 20. Some liquid is also thrown directly from the edge of the disc 34 to add to the curtain of spray. This curtain of spray washes solids and liquids from the gas passing through the chamber 4 and allows the gas to acquire humidity. In practice, it has been found that a single disc 34 is sufficient to provide the necessary volume of liquid spray, although in prior art devices using smooth discs at least two discs have normally been required. The speed of rotation of the disc 34 may be controlled in the conventional manner by varying the voltage applied to the electric motor 28.

Numerous possible variations in the apparatus described above will be apparent to those skilled in the art. Accordingly, the above description of the invention is to be construed in an illustrative and not a limitative sense, the scope of this invention being defined solely by the appended claims.

We claim:
1. In an apparatus for filtering, washing and cooling gas the combination including:
   means forming a chamber, inlet ducting for conducting gas to said chamber and outlet ducting for conducting gas away from said chamber, a foraminous wall within said chamber extending transverse to the direction of gas flow and through which gas passes in its trip from the inlet ducting to the outlet ducting, a pool of water disposed in the bottom of said chamber, means for controlling the upper surface level of said water, said water being of a depth controlled by said controlling means, means for forcing gas through said foraminous wall and means for spraying a curtain of water from said pool across the chamber between the inlet ducting and the wall, said sprayed water serving to filter, wash and cool gas, said foraminous wall serving to prevent entrainment of large droplets of water in the stream of gas passing therethrough, the improvement comprising,
   the means for spraying water including only a single disc rotatable in one direction about an axis, said rotation being in a substantially vertical plane substantially perpendicular to the flow of gas, said disc having a least one projection extending out of the plane of said disc adjacent its periphery, the lowest portion of said disc being covered with water;
   drive means for rotating said disc in said one direction about its axis;
   upper and lower atomizing members fixed on a mounting surface so as not to rotate with said disc, each said atomizing member being located substantially radially of said disc and through the plane thereof and being disposed adjacent the portion of the periphery of the disc which travels upwardly when said disc is rotated in said one direction, said mounting surface being coaxial with said disc,
   said atomizing members being disposed below the axis of said disc but above the upper surface of said water,
   said upper atomizing member extending closer to said axis than said lower atomizing member,
   the plane including said axis of said disc and said upper atomizing member makes an angle of substantially 45° with the vertical plane through said axis of said disc,
   said mounting member is provided with means for limiting the dispersion of the spray provided by said disc in a direction parallel to the axis thereof, said limiting means comprises a shield member mounted on said mounting member and having an edge spaced from but substantially parallel to the plane of said disc, said edge of said shield member lying adjacent said upwardly-travelling portion of said disc, said edge of said sheild member lies adjacent said upper atomizing member, and means for varying the spacing between said edge of said shield member and said disc.

2. An apparatus according to claim 1 wherein said at least one projection comprises a portion of said disc deformed out of the plane thereof.

3. An apparatus according to claim 1 wherein said at least one projection comprises a plurality of projections disposed substantially symmetrically around the edge of said disc.

* * * * *